(Model.)
H. DOWENS.
CORRECTING ATTACHMENT FOR AUTOMATIC HEAT ALARMS.
No. 273,349. Patented Mar. 6, 1883.
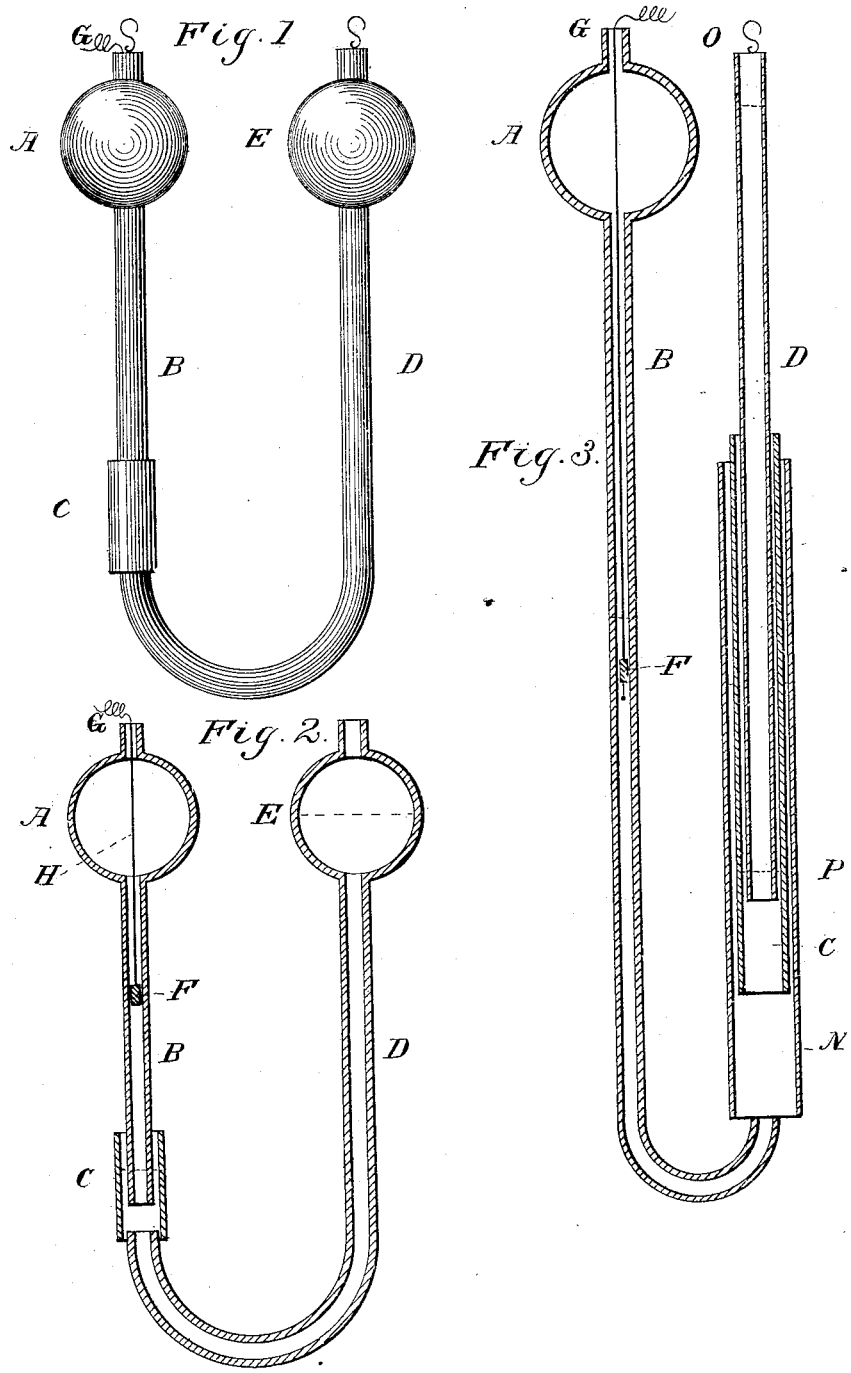
Witnesses:
B. H. Jarvis
T. H. Chichester
Inventor.
Harrison Dowens

UNITED STATES PATENT OFFICE.

HARRISON DOWENS, OF NEW YORK, N. Y.

CORRECTING ATTACHMENT FOR AUTOMATIC HEAT-ALARMS.

SPECIFICATION forming part of Letters Patent No. 273,349, dated March 6, 1883.

Application filed May 10, 1882. (Model.)

*To all whom it may concern:*

Be it known that I, HARRISON DOWENS, of New York, in the county and State of New York, have invented a new and useful Improvement in Fire-Alarms and Automatic Dampers, of which the following is a specification.

The invention relates to devices for sounding fire-alarms, closing automatic dampers, ventilators, &c., and depends for its action upon the expansion and contraction of confined air or other gas, under variations of temperature, against the weight of the atmosphere, in connection with a device for neutralizing the effect of unequal atmospheric pressure.

Various substances have heretofore been employed in similar devices for utilizing the expansive power of heat.

Air possesses great advantages over either solids or liquids on account of its perfect elasticity, its high coefficient of expansion, but especially on account of the small amount of heat absorbed and the consequent rapidity of action. Moreover, instruments in which the heated air expands directly against the outer air, as in the ordinary air-thermometer, have great superiority over those in which the confined air acts against a spring or weight, since the outer air yields instantly to the slightest variation of pressure, whereas the movement of the weight or spring involves the expenditure of heat and consequent loss of time—a matter of vital importance in fire-alarms; but confined air, expanding against the weight of the atmosphere alone, is subject to an error on account of the variation in the weight of the atmosphere itself, which renders the apparatus utterly unreliable. Confined air at the freezing-point expands one part in every four hundred and ninety-one for every degree of heat. To expand one-tenth in volume requires, therefore, a rise of nearly 50° Fahrenheit. The weight of the atmosphere as indicated by the barometer is subject to variations amounting to nearly one-tenth of its entire weight, and as the volume of air is inversely proportional to the pressure it follows that confined air, acting against the weight of the atmosphere alone, is subject to a variation in volume due to change in atmospheric pressure equivalent to about 50° of temperature—an error which utterly unfits this class of instruments for maintaining an even temperature, and greatly impairs their capacity to sound a fire-alarm at the proper moment.

To obviate the error arising from variation in atmospheric pressure, a correcting attachment has been devised, consisting of a barometer-tube attached to one arm of a lever, an air-thermometer being suspended from the other extremity of the lever. Mercury, however, instead of water, is used in the stem of the air-thermometer. The arms of the instrument being *in equilibrio* at any given temperature, an increase in atmospheric pressure drives an equal quantity of mercury up the barometer-tube and the stem of the air-thermometer, and the equilibrium is not destroyed. An increase in temperature expels a portion of mercury from the stem of the air-thermometer, moving the lever and sounding the alarm.

The object of my invention is to provide a new and improved correcting attachment in which the resistance of the atmosphere is supplemented by an additional pressure varying inversely with the weight of the atmosphere, whereby the use of the lever is dispensed with and the working parts of the instrument are relieved of the weight of the column of mercury; and, in case it is desired to use the device in connection with an electrical apparatus, the circuit may be opened and closed simply by the rise and fall of the liquid in the stem of the thermometer.

In the drawings which accompany and form a part of this specification, similar letters of reference indicate like parts.

Figure 1 is a perspective view of a device embodying my invention, and Fig. 2 is a vertical section of the same.

A is a closed vessel, containing air.

B is a tube connecting with the air-chamber A, and partly filled with mercury or other liquid. The lower portion of the tube B is surrounded by the cup C, containing mercury.

D is the tube of an ordinary barometer, terminating at its upper extremity in a bulb, E, and connecting with its cup at C.

F is a float moving freely in the tube B, and connecting with the alarm, or other device to be regulated, by the rod H.

The instrument is prepared for use as follows: The air in the closed chamber A is raised to the temperature at which the instrument is required to act, and the float is adjusted to the surface of the mercury in the tube B and connected with the alarm.

The operation of the device is as follows: The surface of the mercury in the cup C rises and falls with the variations in atmospheric pressure. The effect of increased atmospheric pressure upon the column of mercury in B is neutralized by the increased length of the column. An increase of temperature expels a portion of mercury from the tube, whereupon the float drops, sounding the alarm.

When it is desired to use the instrument in connection with an electrical apparatus in place of the float, one end of the circuit-wire is fixed at F, the other connecting below the mercury in B. When the surface of the mercury falls below F the circuit is broken and the alarm sounded.

If it is desired to connect the attachment with a damper or ventilator, it can be done by electrical means the same as in sounding an alarm.

A modification of this device is shown in Fig. 3, in which the mercury in the tube B is replaced by some other liquid. The tube B terminates in a recurved cup, N, partly filled with liquid. The cup of the barometer C floats in the liquid contained in the outer cup, N. The tube of the barometer D is suspended at O. The height of the liquid at P between the inner and outer cup varies with the amount of mercury in the cup C. The adjustment and operation of the instrument are as before.

Having described the construction of my device and the mode of its operation, I claim as new and desire to secure by Letters Patent—

1. The combination of the air-chamber A and the tube B, containing mercury or other liquid, with the barometer D or its equivalent, operating substantially as and for the purpose specified.

2. The combination of the air-chamber A, the tube B, containing mercury or other liquid, the barometer D, and the float F, or its equivalent, operating substantially as and for the purpose specified.

3. The combination of the air-chamber A, the tube B, containing liquid, the cup N, and the barometer D, or its equivalent, operating substantially as and for the purpose specified.

4. The combination of the air-chamber A, the tube B, containing mercury or other liquid, the barometer D, and the circuit-wire G, operating substantially as and for the purpose specified.

HARRISON DOWENS.

Witnesses:
O. BAUMANN,
CHARLES E. SPRAGUE.